(No Model.) 3 Sheets—Sheet 1.
J. AUSTIN.
PLOW.
No. 317,961. Patented May 19, 1885.
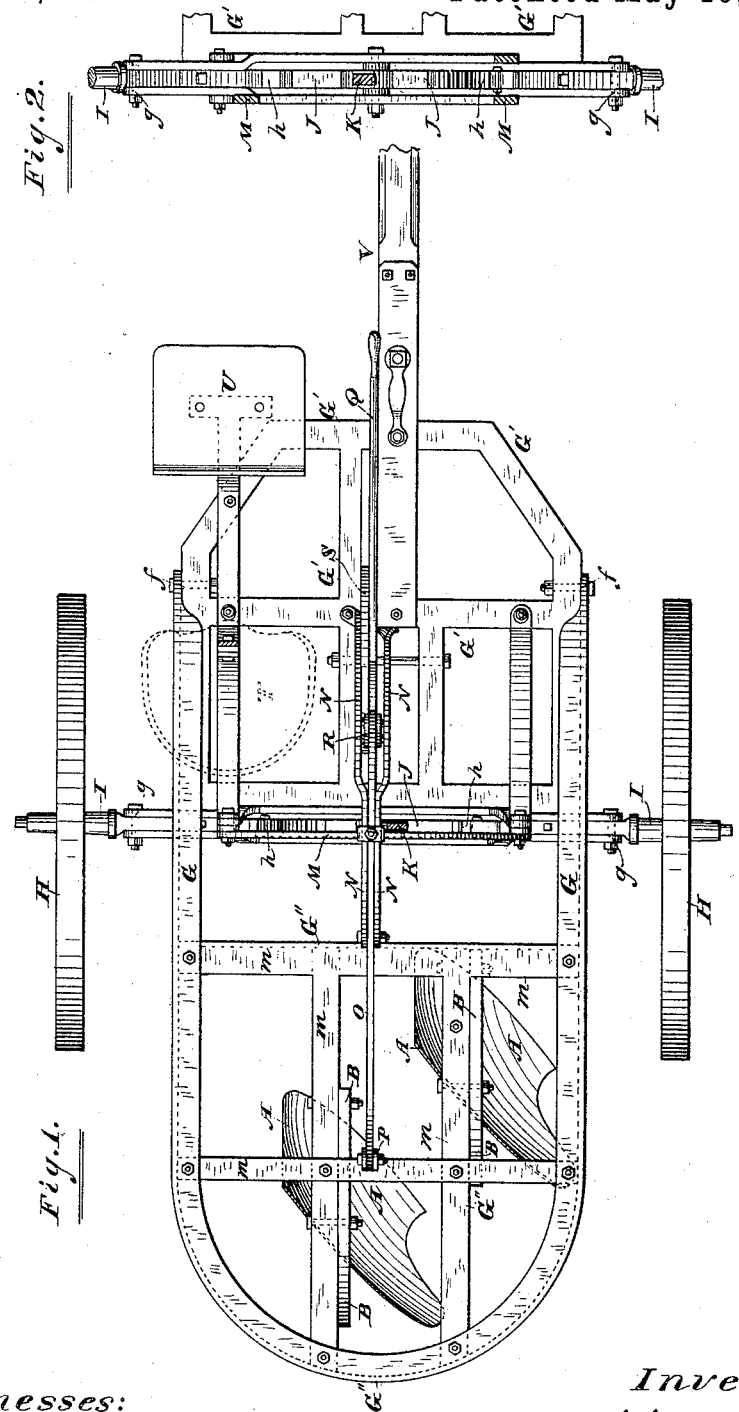
Witnesses:
W. S. Baker
J. B. Halpenny
Inventor:
John Austin
per F. F. Warner
his Attorney.

(No Model.) 3 Sheets—Sheet 2.

J. AUSTIN.
PLOW.

No. 317,961. Patented May 19, 1885.

Witnesses:
W. S. Baker.
J. B. Halpenny

Inventor:
John Austin
per F. F. Warner
his Attorney.

(No Model.) 3 Sheets—Sheet 3.

J. AUSTIN.
PLOW.

No. 317,961. Patented May 19, 1885.

Witnesses:
W. S. Baker,
J. B. Halpenny.

Inventor
John Austin
per F. F. Warner
his Attorney.

UNITED STATES PATENT OFFICE.

JOHN AUSTIN, OF CHICAGO, ILLINOIS.

PLOW.

SPECIFICATION forming part of Letters Patent No. 317,961, dated May 19, 1885.

Application filed September 13, 1884. (No model.)

*To all whom it may concern:*

Be it known that I, JOHN AUSTIN, residing at Chicago, in the county of Cook and State of Illinois, have invented certain new and useful Improvements in Plows, of which the following, in connection with the accompanying drawings, is a specification.

Figure 3:
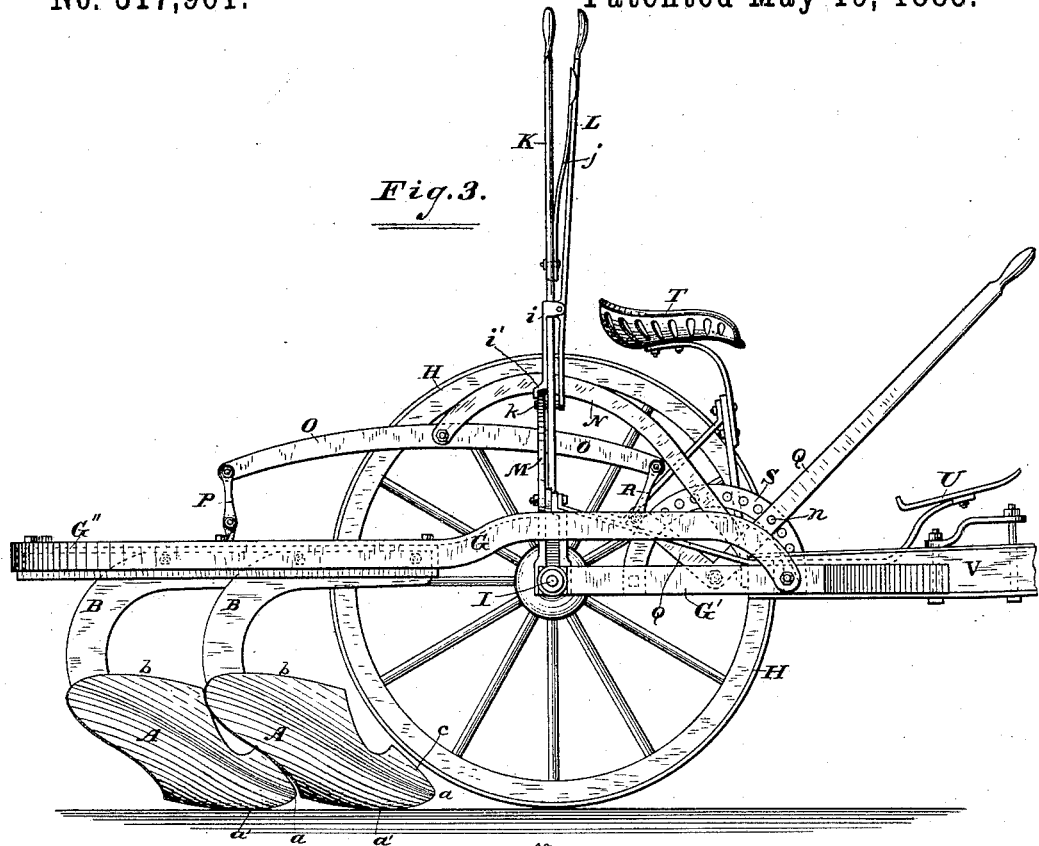
Figure 4:
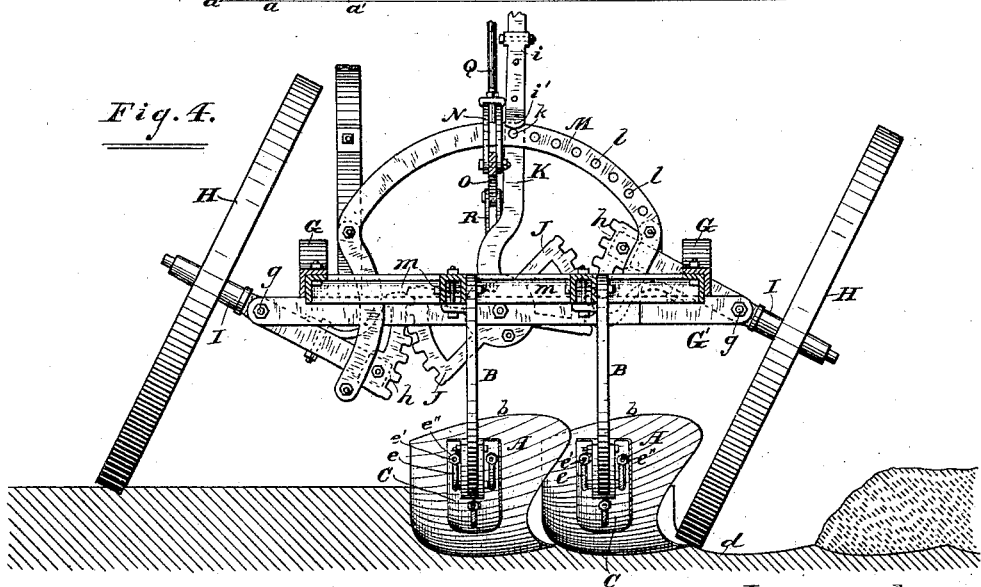
Figure 5:
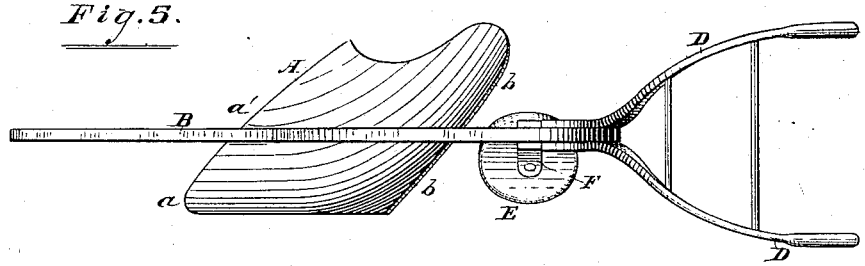
Figure 6:
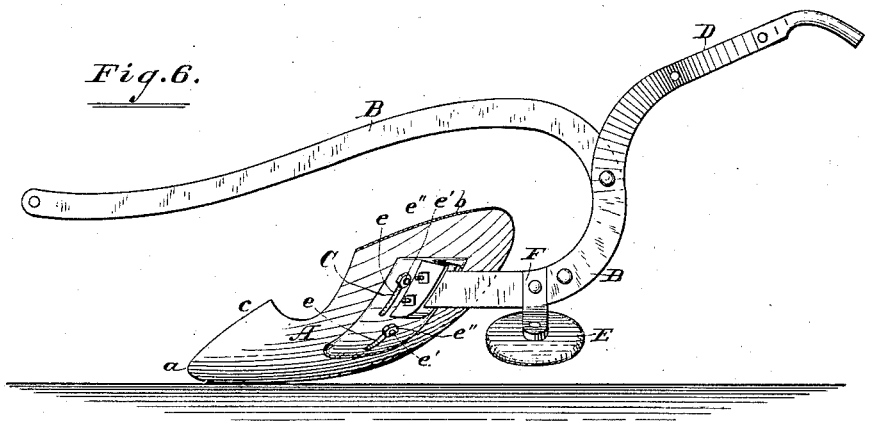
Figure 7:
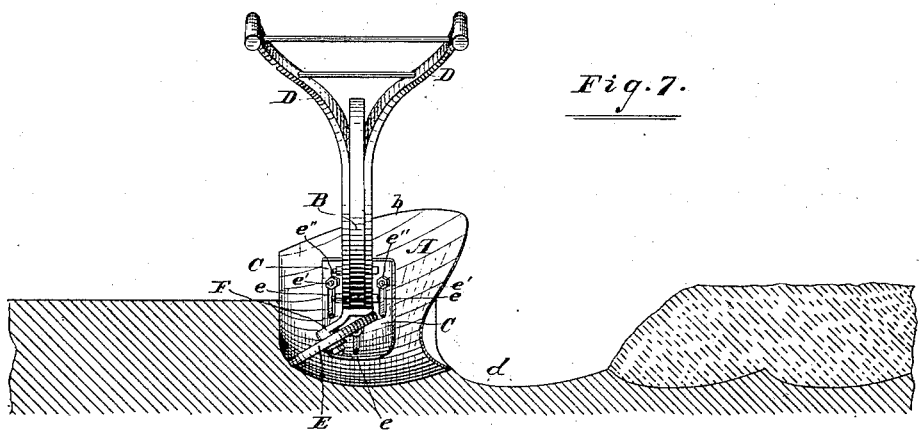

In the drawings, Figure 1 is a top view of a wheeled gang-plow embodying my improvements. Fig. 2 is a detail, the same being a top view of the jointed axle, a part of the frame being broken away to more clearly represent the construction of the parts intended to be there represented. Fig. 3 is a side view of the said wheeled gang-plow. Fig. 4 is a rear view of the same, a portion of the frame being broken away to more clearly represent the parts intended to be there shown. Fig. 5 is a top view of a single hand-plow embodying some of my improvements. Fig. 6 is a side view of the same, and Fig. 7 is a rear view thereof.

Like letters of reference indicate like parts.

As my invention relates to the plow itself, and also to means adapting it to use, either in connection with a wheeled truck or frame or as a hand-plow, I will proceed to describe the hand-plow first.

A is the plow proper, which I make of metal. This part of the plow has a point, $a$, and an inclined front or cutting edge, $a'$, retreating from the point and from the landside. The upper or rear edge, $b$, of the plow is inclined, and rearward of the edge $a'$ and about or nearly parallel with the front edge. That portion of the plow that is included between the edges $a'$ and $b$ is curved or bent, the front surface curving downward and forward, and being concave, so as to turn the land or serve as a mold-board. Behind the point $a$ and on the landside I turn up a portion, $c$, which serves as the landside of the plow, and also shears along the land. The plow is so bent or curved at or near the edge $a'$ as to move along the bottom of the furrow or underneath the earth to be turned over, it being understood that the plow A when in use is held in the position indicated in Fig. 6. In other words, the plow A may be described as being somewhat spoon-shaped, and the form of the furrow made by it is indicated at $d$, Fig. 7. The plow A, as will be perceived, is not only curvilineal between the edges $a'$ and $b$, but is also curved upwardly along its landside. The plow, owing to its peculiar form, cuts its furrow somewhat as wood is cut by a gouge, and therefore performs its work with comparatively little labor by the team. It also scours well in sticky soil.

To use this plow as a hand-plow I employ a curved stock or plow-beam, B, to the lower or rear end of which I apply a plate, C, fitted to the back of the plow A, and in which plate are the slots $e$ $e$; and $e'$ $e'$ are threaded bolts or pins passing through the plow A and the slots $e$ $e$. $e''$ $e''$ are nuts run upon projecting or screw-threaded ends of the bolts $e'$ $e'$. By these means the plow may be very securely attached to the stock or beam B, and also adjusted to secure the plow in its proper position, and also to compensate for wear of the cutting-edges.

D D are the plow-handles, which may be attached to the beam B in any suitable way.

This plow, owing to its form, may be liable, during use, to move toward or tend to move toward the land side of the furrow. This tendency I prevent by securing an inclined guide-wheel or follower, E, to the stock or beam B by means of a clip or hanger, F, or by other suitable means, the inclination of the said wheel being such as to cause it to travel against the lower portion of the land side of the furrow, as is clearly indicated in Fig. 7. By this means much of the care and attention required to keep the plow in its proper course is avoided.

I desire, also, to call attention to the fact that the upturned landside or part $c$ is so curved as to be in continuity with the mold-board, and that the cutting-edge extends entirely along the part $c$ and the edge $a'$ without interruption at the junction of those parts.

Thus far I have described the plow itself and the means employed for adaping it to use as a hand-plow, and I will now proceed to describe the means employed for using it in connection with a truck.

G is the frame of the truck.

G' is the forward part of the frame, and G'' is the rear part, which is hinged or pivoted to the forward part at $f$.

H H are the wheels, and I I are the wheel-axles, which are jointed or pivoted to the part G' of the frame at $g$ $g$.

J is a double-cogged segment pivoted to the part G' of the frame. The inner ends of the axles I I are segmental in form and cogged, as shown at $h\ h$, to engage the cogs on the part J, respectively.

K is a lever, rigidly attached to the part J, and L is a supplemental lever, pivoted to a part, $i$, on the lever K, and rendered yielding by means of a spring, $j$, and having on its lower end a pin, $k$.

M is an arch, in which are the perforations $l\ l$.

By pressing the upper end of the lever L toward the handle of the lever K, the pin $k$, which rests in one of the perforations $l$, will be withdrawn therefrom, and the lever K may then be tilted laterally, and by releasing the lever L the lever K will be temporarily locked in its changed position, as the pin $k$ will then enter another of the perforations $l\ l$. The part $i$ is lipped, as shown at $i'$, to overlap the arch M. By tilting the lever K in this manner the cogged segmental part J will be rocked in such a manner as to tilt the axles I I, and incline the wheels H H in the same direction, as is clearly indicated in Fig. 4, the lever K being there shown as set to hold the wheels at their greatest inclination in one direction. One wheel will then ride upon the land and the other in the furrow and against the land side thereof; but the frame will occupy a horizontal position, as shown, and be parallel with the surface of the land.

The outer bar or beam of the rear or hinged part of the frame I make by preference of angle-iron, and bow-shaped, as shown, and $m\ m$ are cross bars or braces bolted to the outer or bow-shaped beam and to each other, respectively, thereby being detachably connected to the said outer beam. The plow-beams are bolted to those of the braces $m\ m$ which are parallel to the sides of the main frame, and the plows are attached to their beams in the manner already described.

N is a brace or arm, rigidly attached at its forward end to the forward part of the frame, and this brace may consist of two parallel parts, as is clearly indicated in Fig. 1.

O is a lever pivoted to the rear end of the arm N, and linked to the rear part, G'', of the frame by means of a link, P.

Q is a bent lever, pivoted at its angle to the forward part, G', of the frame, and linked to the forward end of the lever O by means of a link, R.

S is a perforated segmental piece, rigidly attached to the forward part of the frame, and the lever Q has thereon a short stud or pin, $n$, located to enter the plate S as the lever Q is moved back and forth, so as to retain the said lever in the position in which it may be set, it being understood that the lever Q is sufficiently flexible to be sprung laterally far enough to permit the pin $n$ to be drawn from the plate S, so that the said lever may be moved.

T is the driver's seat, and U is the foot-rest.

V is the tongue.

It may be here stated that, although the the plow proper, as shown and thus far described, is made in one and the same piece, a share consisting of another piece may be applied to the plow, if deemed best.

It will be perceived that the rear part, G'', of the frame, which carries the plows, may be raised and lowered by means of the lever Q, thus causing the plows to run either deep or shallow, or to be wholly inoperative, as may be desired. It will also be perceived that the inclination of the wheels H H, and especially of the furrow-wheel, will prevent the tendency of the plows to move away from the land, as the frame, by being braced in this manner while plowing is being done, will be held truly in the line of draft, and at the same time both plows will run at the same depth, as the frame remains horizontal or parallel with the surface, although one wheel is lower than the other. In other words, the inclined wheels H H in the wheeled plow perform the same function as the inclined wheel E belonging to the hand-plow, and also aid in regulating the depth of the furrow.

The upward movement of one axle I at its inner end, simultaneously with the downward movement of the inner end of the other axle as the lever K and cogged segment J are moved, results in the maintenance of the frame in a horizontal position, although one of the wheels runs in the furrow and the other on the land, and the plows are thus held in their proper positions for good work.

By making the braces $m\ m$ detachable, the plows may readily be removed, and other working devices—such as a rotary harrow—applied in their stead.

Having thus described my invention, what I claim as new, and desire to secure by Letters Patent, is—

1. The spoon-shaped plow A, having a point, $a$, and a cutting-edge, $a'$, the latter retreating laterally from the said point, the said plow also having a curved upturned shear and landside, $c$, the latter extending from the said point rearward and having its curvature in continuity with the curvature of the part serving as the mold-board, the whole being formed substantially as shown and described, for the purposes set forth.

2. The combination of the beam B, the spoon-shaped plow A, having a point, $a$, and a cutting-edge, $a'$, the latter retreating laterally from the said point, the said plow also having a curved upturned shear and landside, $c$, the latter extending from the said point rearward and having its curvature in continuity with the curvature of the part serving as the mold-board, and the inclined guide-wheel or follower E, attached to the said beam and located on the landside of the plow, substantially as and for the purposes specified.

3. The combination of the spoon-shaped plow A, the beam B, the inclined guide-wheel or follower E, the plate C, having therein one or more slots *e e*, and fitted to the back of the said plow and attached to the said beam, and fastenings for securing the said plow adjustably perpendicularly, substantially as and for the purposes specified.

4. The combination, in a wheeled plow, of one or more spoon-shaped plows, A A, the draft-wheels H H, the vertically-tilting axles I I, and means for tilting the said axles parallelly with each other, substantially as and for the purposes specified.

In testimony that I claim the foregoing as my own I hereto affix my signature in presence of two witnesses.

JOHN AUSTIN.

Witnesses:
F. F. WARNER.
J. B. HALPENNY.